Patented May 8, 1951

2,552,490

UNITED STATES PATENT OFFICE 2,552,490

ACTIVE CHLORINE-CONTAINING COMPOSITION

Henry Clay Marks, Glen Ridge, and Frede Bernhardt Strandskov, Belleville, N. J., assignors to Wallace & Tiernan Products, Inc., Belleville, N. J., a corporation of New Jersey No Drawing. Application February 27, 1946, Serial No. 650,724

7 Claims. (Cl. 210—23)

Our present invention relates to active chlorine-containing compositions and process of preparing same and more particularly to compositions which are usable in or formed as aqueous solutions and/or for the treating of aqueous liquids containing substances capable of reacting with hypochlorous acid to form inactive compounds in which the germicidal properties are considerably diminished if not wholly negligible.

While probably the major utility of compositions according to the present invention will be in the killing of bacteria or as a germicide, the invention is not limited to this use, but pertains more broadly to use as or in connection with aqueous liquids containing one or more substances which would normally inhibit the action of chlorine or compounds providing such chlorine. Inasmuch as the uses other than as germicides have essentially similar requirements thereto as to available active chlorine, the invention will be particularly considered and discussed from the point of view of the effect of the solutions or compositions as germicides, it being understood that as a general rule, compositions which are most effective as germicides are similarly most effective for other purposes where active chlorine is desired.

More particularly, therefore, our invention affords a means of increasing the effectiveness of one class of compounds containing active chlorine. The germicidal properties of active chlorine are well known as is also the ability of chlorine to unite with certain nitrogen compounds to form chloramines or N-chloro compounds. By the latter is meant compounds wherein at least one chlorine atom is attached directly to the nitrogen and wherein the nitrogen is connected to the remainder of the compound by a single bond or by two bonds, the nitrogen being trivalent; and in the event that the nitrogen is only attached to the remainder of the compound by a single bond, the third bond being attached either to hydrogen or a second atom of chlorine or to some other radical as hereinafter set forth. Some of these compounds, such as "Chloramine-T" (sodium-p-toluenesulphonchloramide $CH_3 \cdot C_6H_4 \cdot SO_2 \cdot NNaCl$) are articles of commerce; and many applications of their germicidal powers have been disclosed in the prior art. Some of the members of this class of compounds show certain individual variations in their effectiveness as is evidenced by comparative tests which have been published from time to time.

It is also well known that the germicidal power of active chlorine can be decreased substantially by the presence of certain substances in the environment. For example, many chemical substances have the power of reducing active chlorine to the form of chloride, or in aqueous solution, to chloride ion, wherein the chlorine is no longer available or useful as active chlorine. Other substances, of which proteins and some of their higher molecular weight hydrolysis or degradation products are examples, can bind the chlorine up in the form of very inactive compounds, so that its germicidal properties are substantially diminished.

While many N-chloro compounds are known to be less affected than others by influences of the type described than hypochlorites, for example, they are not immune. A primary object of the present invention, therefore, is to provide compositions such that the chlorine of an N-chloro compound will be prevented from being converted to a germicidally inactive form as previously described, notwithstanding the presence in an aqueous solution with the N-chloro compound of substances which are capable of reacting chemically with available chlorine to form compounds wherein the chlorine has relatively little germicidal activity.

In this connection we have found that the interference with the action of the chlorine of N-chloro compounds can be decreased or minimized by the simultaneous use of a proper amount of a nitrogenous compound corresponding to the N-chloro compound used, i. e., that of which the N-chloro compound is a chlorine derivative. The provision of a composition including an N-chloro compound and a sufficient amount of such a corresponding nitrogenous compound to effect substantial diminution or minimizing of the interference with the activity of the chlorine by substances which may be present and which would otherwise provide such interference is therefore a further and more specific object of the present invention.

Further objects of the present invention are to provide processes of treating aqueous liquids, for example, such as water or sewage, to provide therein germicidally effective active chlorine by treating such aqueous liquids with an N-chloro compound and a sufficient amount of a corresponding compound as aforesaid to prevent the interference with the activity of the chlorine of the N-chloro compound as would defeat the desired objects to be attained, for example, bactericidal sterilization.

Other objects and advantages of the present invention will become apparent from the following description and appended claims.

A general example of a composition in accordance with our present invention and a therory tending to explain the acton taking place is as follows:

The effectiveness of the well known compound "Monochloramine-T" can be increased in an environment containing protein degradation products or other interfering compounds by the simultaneous use of p-toluenesulphonamide, the compound which when chlorinated yields "Chloramine-T." The relation between the two compounds is shown in the following formulae:

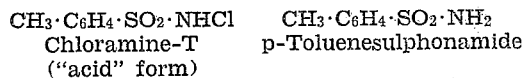

While we do not wish to be bound or limited by any particular theory of operation, the following is now believed by us to be correct and to explain the action taking place in connection with compositions according to the present invention: N-chloro compounds in the presence of water can be hydrolyzed to hypochlorous acid according to the following equation:

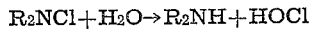

Hypochlorous acid is a very active germicide and is much more reactive chemically than are the N-chloro compounds. In the absence of substances which can either reduce the chlorine or bind it up as inert compounds, the germicidal activity of most N-chloro compounds is approximately proportional to the extent to which they are hydrolyzed to form hypochlorous acid. Under these circumstances, the hydrolysis is a desirable feature, since it results in the liberation of a more active germicide. However, when there is present in the aqueous solution a compound that can react chemically with the hypochlorous acid resulting from the hydrolysis as above set forth in either of the two ways mentioned above, the germicidal effect becomes very small, and indeed is smaller, the greater the extent to which hydrolysis can occur. Under these circumstances anything which can prevent the hydrolysis will keep the chlorine in the form of the N-chloro compound in which it was originally added, and hence will help in getting better disinfection. This is because the N-chloro compound itself and without hydrolysis is also effective as a germicide and is much more effective as such than are many of the compounds in which chlorine may be bound up as aforesaid. According to the present invention, this is what is beleived to be accomplished. In accordance with the well known law of mass action, the presence of a nitrogenous compound of the type aforesaid displaces the hydrolytic equilibrium to the left away from hypochlorous acid and in the direction of the corresponding intact N-chloro compound. This results in decreasing the extent to which the chlorine can be reduced or bound up in an inactive compound and, therefore, results in better disinfection based on the fact that the N-chloro compound itself is a germicide.

The use of the composition and process according to the present invention to increase the disinfecting power of a given concentration of chlorine in the form of an N-chloro compound brings about a number of desirable results. In the first place, it means a saving in the amount of chlorine necessary at the expense of some of the corresponding nitrogenous compound. Frequently the chlorine derivative of such a nitrogenous compound is considerably more difficult to prepare and more expensive, so that a net saving results. Furthermore, there are cases where the desired degree of disinfection cannot be obtained by adding sufficient additional quantities of a chlorine compound (such as the N-chloro compounds referred to) because these quantities are so large that considerations of solubility, mechanical feasibility, etc., intervene.

In other cases, the chlorine concentrations allowable or permissible under the particular conditions to be met are limited as by possible irritation of the skin of personnel who must come into contact with the solution, by the danger of corrosion of equipment, or damage to materials that the solution must contact, by the possibility of undesirable alterations in the nature of the liquid itself, and/or by the necessity of avoiding chlorinous or similar odors.

Even where no improvement in sterilization rate is required under the circumstances, the present invention avoids certain undesirable features which sometimes accompany the use of active chlorine compounds. For example, some environments to be disinfected contain nitrogenous compounds which can unite with active chlorine to form compounds which are volatile and therefore produce a chlorinous or medicinal odor. The process herein disclosed may be applied using a stable non-volatile N-chloro compound simultaneously with a stoichiometric excess, preferably at least 2:1, of the corresponding non-volatile compound as aforesaid. Then, according to the theory hereinabove set forth, the excess of the added corresponding compound will exert its effect through the law of mass action to shift the equilibrium to the left and thus to prevent to any substantial extent the combination of the chlorine with the nitrogenous compounds in the environment to form volatile materials causing undesired odors, by retaining the chlorine combined in the form of the non-volatile N-chloro compound. For this purpose, the N-chloro compound and preferably also the corresponding compound thereto as aforesaid should be non-volatile in character.

The advantages of the subject matter of the present invention can be illustrated by the following specific examples:

N-methyl-p-toluenesulphonamide has been found to increase the effectiveness of its N-chloro derivative in disinfecting an environment which contains material which would otherwise substantially diminish the germicidal activity of the N-chloro compound. It was further found that each increment of the corresponding amide decreased the time necessary for complete sterilization up to the point where the amount added is many times the amount of the chloramide (N-chloro compound) itself.

In Table 1 is shown the utility of this pair of compounds in disinfecting an environment containing two different concentrations of peptone, which is a partially broken-down protein that is commonly used as a constituent of media for the experimental culturing of bacteria. In this experiment the peptone solution was inoculated with bacteria and then shortly afterwards the disinfecting mixture added. These two experiments illustrate the process as applied to a medium resembling a highly contaminated water, or a dilute waste or sewage.

Table 1

Organism *E. coli*, temp. 25° C., pH 7.0
15 P. P. M. N-methyl p-toluenesulphonchloramide
A. Peptone concentration=20 P. P. M. nitrogen
[P. P. M.=parts per million]

| P. P. M. N-methyl p-toluenesulphon- amide | Time for 99% kill, minutes |
|---|---|
| 0 | 100 |
| 650 | 73 |
| 1,300 | 4 |

B. Peptone concentration=40 P. P. M. nitrogen

| P. P. M. amide | Time for 99% kill, minutes |
|---|---|
| 0 | 130 |
| 1,300 | 25 |

In Table 2 is illustrated the effect of the same combination of amide and chloramide on much higher concentrations of peptone, in which higher chlorine concentrations had to be used to bring about bacterial reduction. Although the concentrations are very different in the case than in the others, the effect is the same and the advantage of using the amide is evident.

Table 2

Organism *E. coli*, temp. 25° C., pH 7.0
300 P. P. M. N-methyl p-toluenesulphonchloramide
Peptone concentration=0.2%

| P. P. M. N-methyl p-toluenesul- phonamide | time for 99% kill, minutes |
|---|---|
| 0 | 90 |
| 400 | 70 |
| 1,100 | 55 |

In table 3 is shown the sterilization of 0.2% peptone solution by mixture of "Chloramine-T" (sodium-p-toleuenesulphonchloramide) and its corresponding amido compound (p-toluenesulphonamide).

Table 3

Organism *E. coli*, temp. 25° C., pH 7.0
300 P. P. M. p-toluenesulphonchloramide (as sodium salt)
Peptone concentration=0.2%

| P. P. M. p-toluene- sulphon- amide | time for 99% kill, minutes |
|---|---|
| 0 | 47 |
| 370 | 22 |
| 980 | 8 |
| 2,200 | 3 |

The experiments shown in Tables 2 and 3 were carried out by adding the disinfecting mixture to the peptone solution, holding for 30 minutes, and then adding the bacteria. These experiments therefore more nearly resemble the process of disinfecting dish water, etc., where the concentration of contaminants is higher and where bacteria may be introduced at any time after the beginning of the operation, so that the activity of the chlorine needs to be maintained.

As an example of a practicable composition 1 part by weight "Chloramine-T" and 3 parts p-toluenesulphonamide may be used.

3,5,5 trimethyl hydantoin has been found to have a similar desirable action when used with its N-chloro derivative in the presence of a substance which would otherwise substantially interfere with the germicidal action of this N-chloro derivative.

Considering now the essential requirements of the various ingredients of the composition, the first one is the N-chloro compound. If the composition of the present invention is to be used almost immediately after it is prepared, relatively unstable and/or volatile N-chloro compounds may be used as an ingredient thereof. If, however, the composition is required to be stored for any substantial period of time, or shipped from place to place, then the N-chloro compound used should be of a stable and non-volatile type.

This compound must further be of a type wherein the chlorine is relatively active as a germicide in aqueous solution, at least as compared with compounds which could be formed as a result of chemical combination between active or available chlorine and any of the substances which might be present in the solution and which might tend to interfere with the effectiveness of the N-chloro compound as a germicide.

It is contemplated and to be considered within the purview of this invention that the N-chloro compound may be formed in effect in situ in the aqueous liquid by introduction into the liquid containing a nitrogenous compound capable of forming such an N-chloro compound, chlorine or some composition containing available chlorine and from which the chlorine may be taken by chemical interchange to form this N-chloro compound.

The essentials as to the other or corresponding nitrogenous compound to be added to the composition to protect the N-chloro compound against interference as aforesaid are as follows: first, the same requirements apply as to stability and volatility as in the case of the N-chloro compound. Furthermore, it must be soluble in the aqueous liquid in at least an effective amount. The compound in this case is that of which the N-chloro compound used is a chlorine derivative. Under these circumstances, it is essential to use this corresponding nitrogenous compound in a relative mol concentration to the N-chloro compound of at least 2:1 and preferably greater.

The following considerations apply to both the N-chloro compound and to the corresponding unchlorinated nitrogenous compound used therewith: the compounds in which chlorine may be sufficiently active as a germicide to carry out the purposes of our present invention are usually those wherein both the N-chloro compound and the corresponding unchlorinated nitrogenous compound have molecular weights not over about 300. Thus, for example, some of the N-chloro compounds which could be formed by reaction between chlorine and some of the higher molecular weight hydrolysis or degradation products of protein are eliminated, these compounds thus eliminated including chlorinated compounds of polypeptides of the type of lysalbinic and protalbinic acids having molecular weights of about 750.

One class of materials which has proven in practice to be particularly advantageous as bases for a combination for an N-chloro compound and the corresponding unchlorinated compound are those embraced in the general formula for the N-chloro compound $$p\text{-}CH_3 \cdot C_6H_4 \cdot SO_2 \cdot NRCl$$

wherein R is either a saturated alkyl group having not over 6 carbon atoms or an alkali or alkaline earth metal as sodium and calcium respectively. Examples of this class of compounds are given hereinabove in Tables 1 and 2 for example in which R is methyl.

Straight chain compounds such as N-chloro biuret (NH₂·CO·NH·CO·NHCl) and is corresponding amine, biuret (NH₂·CO·NH·CO·NH₂) may be used.

Furthermore, while the examples of the N-chloro compounds given above are mono-chlor compounds and are presently preferred, di-chlor compounds may in certain instances be used. Examples of this are "Dichloramine-T" and halazone (dichlorosulphonamidobenzoic acid). In the latter case the monochloro derivative is unknown as it apparently is too unstable to exist in the solid state.

It will be noticed from the examples given above that as the ratio of the two ingredients of the composition varies, the disinfecting power also varies. The low limit of unchlorinated compound with respect to the amount of its chlorine derivative, the N-chloro compound, present is at least an effective amount, such as substantially to increase the effectiveness of the whole as a bactericide under the conditions above discussed in respect to the same composition including the same N-chloro compound, but without the corresponding unchlorinated compound. This low limit from a practical point of view is a ratio of concentrations of at least 2 weight mols of the corresponding unchlorinated compound for each weight mol N-chloro compound. On the other hand, with particular compounds this ratio may be greater, for example, when using the combination of compounds given in Table 1 hereinabove, a mol ratio of at least 3:1 is preferred, while when using other combinations, a mol ratio of at least 5:1 is preferred.

The upper limit of relative concentrations of the unchlorinated compound to its corresponding N-chloro compound is usually dictated not by the chemistry of the composition or the actual effect, but rather by economic factors and in some instances by other extraneous factors such as solubility, etc. Under the circumstances it is thought best to leave the upper limit to the judgment of the user, as increasing proportions of unchlorinated compound improve the results, but there comes a point when either solubility or cost prevents further increase in this proportion, even though such further increase might effect a technical improvement as illustrated by the tables given above.

In preparing an aqueous solution wherein the aqueous liquid to which materials are added in accordance with the present invention contains substances which may effect a reduction in the germicidal activity of chlorine as aforesaid, it is necessary that the unchlorinated compound be added before or simultaneously with the addition of chlorine or a chlorine-containing compound such as the N-chloro compounds above discussed. Otherwise, any available chlorine added in advance of the unchlorinated compound would be subject to being bound up in a germicidally inactive compound as previously discussed.

While there are disclosed herein a number of different particular compounds and certain classes of compounds effective for the major ingredient elements of the composition of the present invention and for carrying out the process thereof, we do not wish to be limited to these particular materials but only to the teachings hereinabove given as to the essential considerations required for the individual ingredients of the novel combination. Such basic principles are clearly set forth hereinabove and are claimed in the appended claims, which are to be construed validly as broadly as the state of the prior art permits.

What is claimed is:

1. An active chlorine-containing composition for use in aqueous solution in the presence of substances capable of reacting chemically with hypochlorous acid to form compounds wherein the chlorine has relatively little germicidal activity, the essential active ingredients of said composition consisting of an N-chloro compound, which is a sulphonchloramide, wherein the chlorine has a relatively great germicidal activity in aqueous solution, and the corresponding sulphonamide, which contains no chlorine and of which said N-chloro compound is the chlorine derivative, and the mol ratio of concentrations of said corresponding amide to said N-chloro compound being at least 2:1.

2. The process which comprises contacting an aqueous liquid containing substances capable of reacting with hypochlorous acid to form compounds wherein the chlorine has relatively little germicidal activity, with an N-chloro compound, which is a sulphonchloramide, wherein the chloride has relatively great germicidal activity in aqueous solution, and with at least twice the molecular amount of a corresponding sulphonamide, which contains no chlorine and of which said N-chloro compound is the chlorine derivative, and dissolving all said corresponding sulphonamide to be used as aforesaid to provide an aqueous solution thereof, and establishing in said aqueous liquid a concentration of said corresponding sulphonamide at least twice the final desired molal concentration of said sulphonchloramide at least as soon as any of said sulphonchloramide is present in solution in said aqueous liquid.

3. An active chlorine-containing composition in accordance with claim 1, wherein said N-chloro compound is a compound having the formula

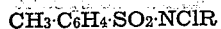

and said corresponding compound has the formula

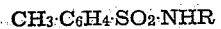

in both of which R is a saturated alkyl group having not over 6 carbon atoms.

4. An active chlorine-containing composition in accordance with claim 1, wherein said N-chloro compound is an alkali metal salt of para-toluenesulphonchloramide and said corresponding compound is para-toluenesulphonamide.

5. The process according to claim 2, wherein said N-chloro compound has the formula

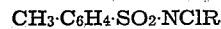

and said corresponding compound has the formula

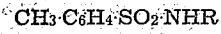

in both of which R is a saturated alkyl group having not more than 6 carbon atoms.

6. The process according to claim 2, wherein said N-chloro compound is an alkali metal salt of p-toluenesulphonchloramide and said corresponding compound is p-toluenesulphonamide.

7. An active chlorine-containing composition for use in aqueous solution in the presence of substances capable of reacting chemically with hypochlorous acid to form compounds wherein the chlorine has relatively little germicidal activity, the essential active ingredients of said composition consisting of an N-chloro compound containing the group —$C_6H_4 \cdot SO_2 \cdot NCl$—, wherein the chlorine has a relatively great germicidal activity in aqueous solution, and a corresponding compound containing the group —$C_6H_4 \cdot SO_2 \cdot N=$, of which said N-chloro compound is the chlorine derivative, the mol ratio of concentrations of said corresponding compound to said N-chloro compound being at least 2:1.

HENRY CLAY MARKS.
FREDE BERNHARDT STRANDSKOV.

REFERENCES CITED

The following references are of record in the file of this patent:

UNITED STATES PATENTS

| Number | Name | Date |
|---|---|---|
| 1,891,462 | Wood | Dec. 20, 1932 |
| 1,894,969 | Wood | Jan. 24, 1933 |
| 2,130,805 | Levine | Sept. 20, 1938 |
| 2,312,221 | Sprigman | Feb. 23, 1943 |

FOREIGN PATENTS

| Number | Country | Date |
|---|---|---|
| 691,822 | France | July 21, 1930 |